Figure 3:
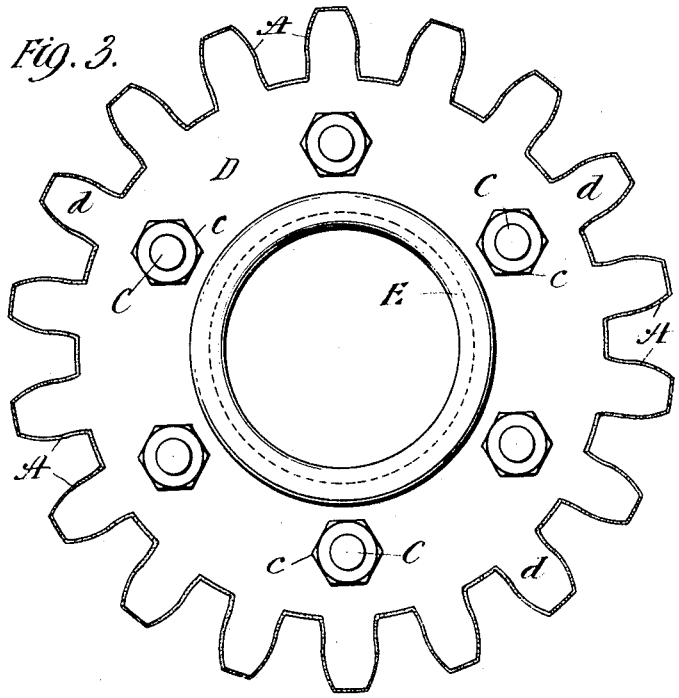

H. HESS.
GEAR WHEEL.
APPLICATION FILED MAR. 10, 1911.
1,085,420.
Patented Jan. 27, 1914.
2 SHEETS—SHEET 1.
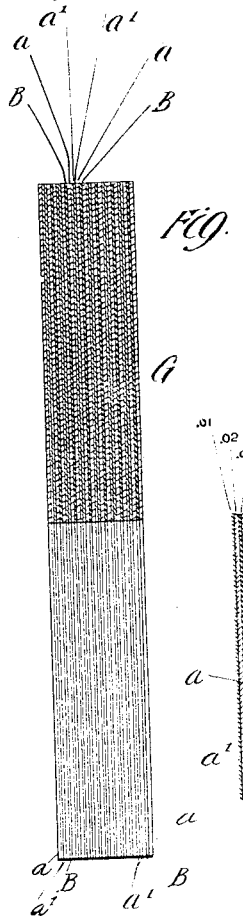
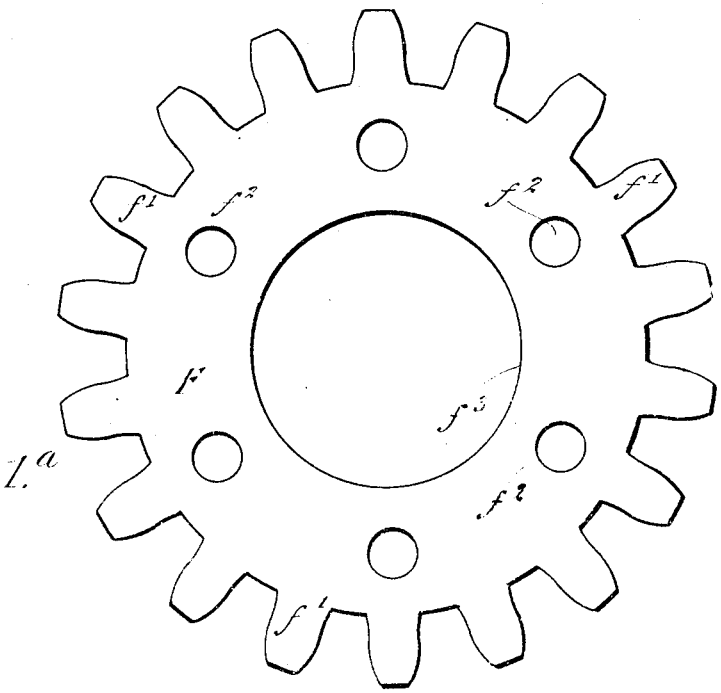
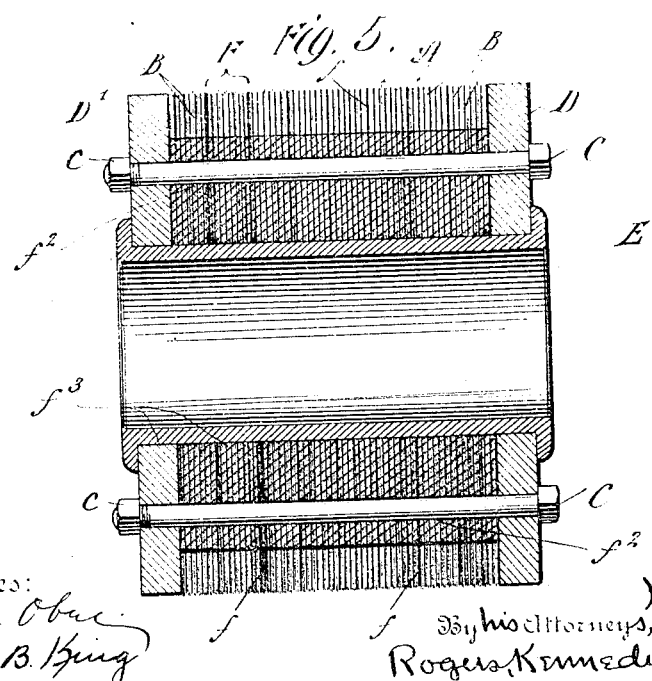
Witnesses:
Francis Ober
Elizabeth B. King
Inventor,
Henry Hess,
By his Attorneys,
Rogers, Kennedy & Campbell

H. HESS.
GEAR WHEEL.
APPLICATION FILED MAR. 10, 1911.

1,085,420.

Patented Jan. 27, 1914.

2 SHEETS—SHEET 2.

Witnesses:
Frank D. Ober
Elizabeth B. King

Inventor,
Henry Hess,
By his Attorneys,
Rogers, Kennedy & Campbell.

UNITED STATES PATENT OFFICE.

HENRY HESS, OF PHILADELPHIA, PENNSYLVANIA.

GEAR-WHEEL.

1,085,420.

Specification of Letters Patent. Patented Jan. 27, 1914.

Application filed March 10, 1911. Serial No. 613,632.

*To all whom it may concern:*

Be it known that I, HENRY HESS, a citizen of the United States, residing at Philadelphia, in the county of Philadelphia and State of Pennsylvania, have invented certain new and useful Improvements in Gear-Wheels and the like, of which the following is a specification, reference being had therein to the accompanying drawing.
My invention relates to gears or analogous machine elements such as pinions, worms or certain cams where there is a rolling contact or similar action.

Particularly my invention relates to the mode of constructing or building up such gear or analogous element and to the composite element so produced.

Among the objects of the present invention is to produce a gear or other element that will have the qualities of silence in action, of strength, of rigidity or inflexibility, of simplicity of manufacture and therefore cheapness. To attain these and other objects which will appear hereinafter, my gear is constructed of the form and in the manner which will hereinafter appear.

The invention in a broad sense consists of a gear or analogous machine element composed of a plurality of thin layers or laminæ of different materials alternated with each other and held together so as to form a unitary whole; and the laminæ being preferably of metal alternated with non-metallic substances, such for example as muslin, cork, leather, rawhide, paper, metalfoil, silk, brass, etc.

A further object of my invention is to enable the employment of the materials mentioned so as to retain all the good qualities of the respective materials, and to avoid the objectionable qualities, such as the swelling which sometimes occurs in gears built of rawhide by methods heretofore known.

More specifically speaking my invention contemplates a gear built up of laminæ of metallic and non-metallic substances in which the metal laminæ are slightly smaller than the others so as to stand slightly below the gear surface; and preferably the metal laminæ will be much fewer than the non-metallic laminæ; whereby the resulting surface will be entirely non-metallic and have the silent qualities desired, whereas the gear retains the desired strength and inflexibility.
This particular construction of gear I prefer to produce by a method involving the assemblage of laminæ of equal size and then through excessive endwise pressure causing the softer or non-metallic laminæ to flatten out and expand so as to stand farther out from the gear surface than the metallic laminae, in which condition the parts are permanently united and held together to form a unitary whole, possessing the advantageous qualities recited.

I will first describe one embodiment of my improvements and will then point out the novel features in the claims.

Figure 4:
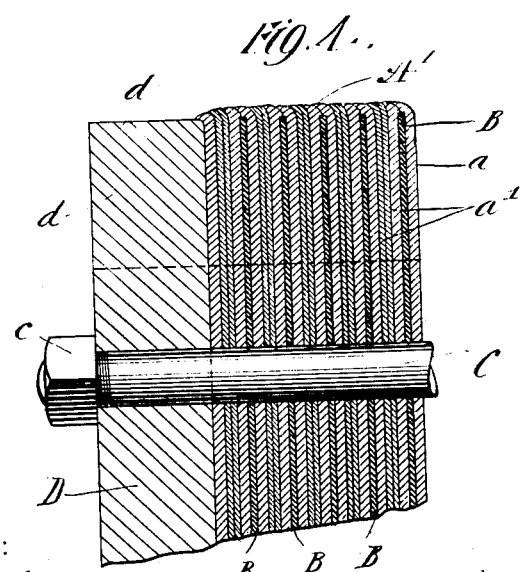

In the drawings forming a part of this specification, Figure 1 represents a sheet or strip of material half in section, half in full view, said material being built up of different substances and capable of having blanks stamped therefrom. Fig. 1ª represents in section another form of built-up sheet from which blanks may be produced, this having laminæ to the number of five, whereas the sheet in Fig. 1 is shown as having laminæ to the number of thirty. Fig. 2 represents a blank in face view such as may be stamped or cut from a sheet of material such as shown in Figs. 1 and 1ª. Fig. 3 represents an end or face view of a complete gear made up of blanks, end plates, bolts, etc. Fig. 4 represents an enlarged corner of the gear seen in Fig. 5. Fig. 5 is a central cross-section of the gear shown in Fig. 3 after compression has been applied and the bolts tightened up.

Similar letters of reference designate corresponding parts in the several figures of the drawings.

Referring first to Figs. 3 and 5, a gear embodying my invention is there disclosed. This consists primarily of numerous laminæ of different materials intimately associated into a substantially unitary element. Thus there may be non-metallic layers A alternated with metallic layers B, the latter being distinguished in Fig. 5 by appearing as a heavier or darker line. No set relative proportions are required of metallic and non-metallic laminæ, but I prefer to employ one metallic lamina B alternated with a plurality of non-metallic laminæ, this being indicated in Fig. 5. A more specific arrangement of the laminæ will be described in connection with the other figures. In the completed gear all of the layers or laminæ are to be permanently held together to form a unitary whole, and I prefer for this purpose to employ devices such as bolts C having nuts c thereon, which bolts will preferably coöperate with end plates D, D'. As an additional means of holding the parts together, cement may be employed between each of the laminæ applied during or before the process of building up the gear. A central sleeve E may be employed either turned or otherwise secured in place after the gear is in other respects completed.

Obviously the different diameters may be altered as desired without affecting the principles of the invention, namely the interior diameter of the part E, the interior diameter or bore of the assembled laminæ, and the external diameter of the completed gear.

It will be perceived that the metal laminæ B are slightly smaller or less in area than the other laminæ, so that the metal at all points stands slightly below the non-metallic surface. This is an important desideratum and is one of the main objects already recited of the present invention, although in some cases the invention might be employed as to some of its features without making the difference referred to between the metallic and non-metallic laminæ.

At regular intervals in Fig. 5 are seen lines marked f which are heavier or darker than the lines representing the laminæ B. These lines f designate the division lines between the several blanks when the gear is built up of blanks. One of the blanks will, for example, be that marked F Fig. 5. The use of such blanks is in connection with my novel method of constructing a gear, as will be hereinafter described.

Instead of making up the gear shown in Fig. 5 by assembling therein single layers of metal, cork, muslin, etc., I prefer to operate as follows, namely, by first assembling a number of thin layers or laminæ of the various materials into a sheet or strip and then punching from such sheet or strip by suitable dies (or in some cases cutting therefrom) a number of similar blanks. Figs. 1 and 1ª indicate the built-up sheets of material, and I will now describe their construction, after which I will refer more fully to the blanks to be cut therefrom and to the mode of assemblage of such blanks to form a gear or other machine element.

While the choice of materials may be varied, I have taken sheet steel, cork and muslin as constituting a typical example of an embodiment of my invention. In assembling these I prefer to have several layers of the non-metallic to each layer of metallic substance; and between each two metallic layers B the non-metallic layers may be as follows, namely, cork a, muslin a', muslin a', cork a. With this arrangement the entire sheet G Fig. 1 may consist of cork, muslin, muslin, cork, steel, cork, muslin, muslin, cork, steel, etc., repeated throughout the sheet. A similar result may be obtained by the sheet G' of Fig. 1ª which is thinner having only one set of laminæ, namely, muslin, cork, steel, cork, muslin.

Otherwise than in the order and arrangement of the laminæ, the sheets G and G' may be varied in obvious ways, although I prefer that each of the thin layers shall be continuous rather than discontinuous or perforated, and I prefer also that all of the layers shall be intimately associated and secured together by cementing.

In using the word lamina in connection with the layers of material, I mean that the same are to be in their nature somewhat or extremely thin rather than each layer having such thickness as to give it any strength or resistance apart from its association with the other layers. The order of the thinness of the layer may be described by stating that I prefer that each layer shall be within a few hundredths of an inch, and the specific dimensions that I prefer in the described instance of my invention are as follows: each layer of cork .02 inch, each layer of muslin and of steel .01 inch. With these dimensions the sheet indicated in Fig. 1 will in total thickness be .42 inch, whereas that shown in Fig. 1ª will be .07 inch.

My improved gear is superior to any heretofore known gear in the qualities previously referred to. By being built up of a great number of very thin layers or laminæ my gear for example is rendered far superior to a gear of similar dimensions composed of relatively few layers of thick materials such as leather, rawhide and metal, for that the latter among other things is subject to more or less objectionable swelling of the soft material, while owing to the thickness of the metallic section, the sound is not sufficiently deadened. With my invention the thin laminæ mutually support and restrain one another, and the steel and the soft layers are so intimately in contact and alternate so frequently as to preclude any sensible swelling of the soft layers, while the latter will in turn deaden all sonorous qualities of the steel layers.

I prefer to construct a gear embodying my invention by the following novel steps: Beginning with the sheets or strips G or G', I will first produce therefrom a number of blanks such as F, Fig. 2. These blanks will preferably be made by stamping them from the composite sheet material. These blanks are provided with the teeth f', bolt holes f² and central bore f³, and they are therefore ready for assemblage. A proper number of such blanks will be taken for assemblage according to the thickness of the desired gear; for example eight blanks cut from sheet G may be assembled to form the gear shown in Fig. 5. The blanks may be brought into proper alinement with each other by assembling them in a jig having, say, three equally distributed bars fitting into toothed spaces, and the end plates D when they are toothed may also be assembled in the jig with the blanks. This assemblage of blanks and end plates will then be subject to a sufficient binding pressure to enable the bolt holes to be reamed out to insure accurate fit and assemblage, the bolts C being very carefully fitted to the bolt holes. This being done additional extremely heavy pressure will then be applied so as to squeeze and compress the assembled blanks between the end plates, upon which and before the pressure is released, the bolts C will be inserted, these having first preferably been heated enough to secure some expansion and subsequent contraction thereof. The nuts $c$ are then immediately drawn up tightly so that when the bolts have been cooled they will clamp the parts of the gear together with a shrink fit. A result of this method and assemblage is that the non-metallic layers A, which are softer than the metallic layers B and are considerably thicker than the latter, will be displaced by the compression, flattened and forced laterally outward to some degree so that in the assembled and compressed gear the non-metallic portions will stand distinctly, though slightly farther out from the metallic laminæ, as clearly indicated in Fig. 5. Also in Fig. 3 are seen the outstanding layers A. This effect will be further promoted to a small extent by the action upon the soft layers of the die mechanism which punches out the blanks F.

The end plates D, it should be said, may be circular in outline so as to form shrouds for the gear, but I prefer to construct said end plates with teeth $d$, Fig. 3, and of the same size as the steel laminæ B, so that said teeth $d$, as well as the laminæ B, will stand slightly below the non-metallic contact surface of the gear.

Fig. 4 shows in an enlarged view a cross-section of the upper left-hand corner of Fig. 5, and here will be more plainly seen the relations of the different laminæ. The metallic laminæ B and the teeth $d$ of the end plates will be seen to be on a line with each other, while the non-metallic laminæ are shown as having been squeezed or displaced upwardly beyond the metallic portions. This figure is also intended to show the manner in which the different projecting non-metallic laminæ tend to consolidate themselves into a uniform contact surface, as seen at A′, the metal being entirely buried and concealed and the contact surface being uniform and non-metallic. There are therefore no spaces, openings or breaks in the contact surface at the points where the metallic laminæ are situated, and this very important advantage is one of those attained by the feature of my invention which provides for such extremely thin laminæ, the steel sheet B being only .01 of an inch in thickness. At the same time such laminæ are provided at sufficiently frequent intervals to give the gear the requisite strength and inflexibility.

When the gear becomes substantially worn, the overlying non-metallic surface A′ may disappear and the sheet steel laminæ B may come to the surface; at which point the gear may be discarded as any extensively worn gear would be discarded, or it might be continued in use notwithstanding the exposure of the edges of the steel laminæ. The gear with the steel laminæ exposed would still possess many of the advantages and embody certain of the features of my improvements.

The several different non-metallic laminæ, namely four of them, located between each two of the metallic laminæ, may be considered as together forming a layer which with the dimensions above given would be .06 inch in thickness. This non-metallic material between each two metallic laminæ is preferably built up as stated, but might consist of a single non-metallic piece constituting what might be called a relatively thick lamina.

Many obvious changes in proportions, sizes, materials and details of construction may be made within the scope of my invention, and I do not intend to limit the same except in such respects as are set forth in the appended claims.

What I claim and desire to secure by Letters Patent is:

1. The method of manufacturing gear wheels by assembling in line many laminæ comprising non-metallic laminæ alternated with periodic metallic laminæ, excessively compressing them to force outwardly the non-metallic material beyond the metallic laminæ, and securing the whole together to form the gear wheel.

2. A gear wheel having a construction which comprises a plurality of assembled blanks compressed and united into a single entity, each of the component blanks produced from a sheet built up of many laminæ including metallic and non-metallic laminæ.

3. A gear wheel having a construction which comprises a plurality of assembled blanks compressed and united into a single entity, each of the component blanks produced from a sheet built up of many laminæ including metallic and non-metallic laminæ; the metallic laminæ being periodically located and the non-metallic portions of the wheel standing out beyond the metallic laminæ.

4. A silent gear wheel composed of many laminæ of different materials, having substantially the order of thinness specified, and alternated with each other and held intimately together to form a unitary whole.

5. A silent gear wheel composed of many laminæ of different materials, having substantially the order of thinness specified, and alternated with each other and held intimately together to form a unitary whole, said laminæ being principally non-metallic, but with periodic metallic laminæ.

6. A silent gear wheel composed of many laminæ of different materials alternated with each other and held intimately together to form a unitary whole, said laminæ being principally non-metallic, but with periodic metallic laminæ, the metallic laminæ standing slightly below the contact surface.

7. A silent gear wheel composed of many laminæ of different materials alternated with each other and held intimately together to form a unitary whole, said laminæ being principally non-metallic, but with periodic metallic laminæ, means whereby the whole is held under high compression to cause the non-metallic material to stand out above the metallic laminæ.

8. A gear wheel or analogous machine element adapted to operatively engage another machine element, the same constructed as follows, namely, built up of non-metallic material alternated with periodic metallic laminæ, the non-metallic material being in the form of laminæ of sound-deadening character, there being a plurality thereof between each two metallic laminæ.

9. A gear wheel or analogous machine element adapted to operatively engage another machine element, the same constructed as follows, namely, built up of rigid non-metallic material alternated with periodic metallic laminæ, means whereby the whole is held under high compression causing the non-metallic material to stand farther out than the metal.

10. A gear wheel or analogous machine element adapted to operatively engage another machine element, the same constructed as follows, namely, built up of non-metallic material alternated with periodic metallic laminæ, the non-metallic material being in the form of laminæ of sound-deadening character, there being a plurality thereof between each two metallic laminæ, and means whereby the whole is held under high compression causing the non-metallic material to stand farther out than the metal.

11. A silent gear wheel composed of many laminæ of different materials alternated with each other and held intimately together to form a unitary whole, said laminæ being principally sound-deadening, but with periodic strength-giving laminæ, the strength-giving laminæ standing slightly below the contact surface.

12. A gear wheel or analogous machine element adapted to operatively engage another machine element, the same constructed as follows, namely, built up of sound-deadening material alternated with periodic strength-giving metallic laminæ, means whereby the whole is held under high compression causing the sound-deadening material to stand farther out than the metal.

In testimony whereof I have affixed my signature in presence of two witnesses.

HENRY HESS.

Witnesses:
NETTIE L. HAHN,
C. L. M'CALLA.